US007542815B1

(12) United States Patent
Berchin

(10) Patent No.: US 7,542,815 B1
(45) Date of Patent: Jun. 2, 2009

(54) EXTRACTION OF LEFT/CENTER/RIGHT INFORMATION FROM TWO-CHANNEL STEREO SOURCES

(75) Inventor: Gregory J. Berchin, Savage, MN (US)

(73) Assignee: Akita Blue, Inc., Hollis, NH (US)

( * ) Notice: Subject to any disclaimer, the term of this patent is extended or adjusted under 35 U.S.C. 154(b) by 959 days.

(21) Appl. No.: 10/932,214

(22) Filed: Sep. 1, 2004

Related U.S. Application Data

(60) Provisional application No. 60/500,104, filed on Sep. 4, 2003.

(51) Int. Cl.
*G06F 17/00* (2006.01)

(52) U.S. Cl. ............................ 700/94; 381/17; 381/18; 381/20; 381/21; 381/27; 381/97; 381/98; 381/99; 381/100; 381/101; 381/102; 381/103; 381/307; 381/310; 370/426; 370/478; 369/86; 369/87

(58) Field of Classification Search .................... 700/94
See application file for complete search history.

(56) References Cited

U.S. PATENT DOCUMENTS 4,024,344 A 5/1977 Dolby et al.
4,074,083 A 2/1978 Berkovitz et al.
4,152,542 A 5/1979 Cooper
4,293,821 A 10/1981 Boudouris et al.
4,594,730 A * 6/1986 Rosen ......................... 381/27
4,685,136 A 8/1987 Latshaw
4,799,260 A 1/1989 Mandell et al.
4,862,502 A 8/1989 Griesinger
4,941,177 A 7/1990 Mandell et al.
5,046,098 A 9/1991 Mandell et al.
5,136,650 A 8/1992 Griesinger
5,216,718 A * 6/1993 Fukuda ........................ 381/18
5,257,313 A * 10/1993 Fujishita et al. ............... 381/18
5,274,740 A 12/1993 Davis et al.
5,291,557 A * 3/1994 Davis et al. ................... 381/22
5,333,201 A * 7/1994 Waller, Jr. .................... 381/22
5,400,433 A 3/1995 Davis et al.

(Continued)

OTHER PUBLICATIONS

Avendano et al., "A Frequency-Domain Approach to Multichannel Upmix," *J. Audio Eng. Soc.*, vol. 52, No. 7/8, pp. 740-749 (Jul./Aug. 2004).

(Continued)

*Primary Examiner*—Curtis Kuntz
*Assistant Examiner*—Paul McCord
(74) *Attorney, Agent, or Firm*—Law Offices of Paul E. Kudirka

(57) ABSTRACT

A digital audio signal processing system and method transforms two-channel stereo time-domain data into the frequency domain. Vector operations are performed upon the frequency-domain data by which signal components unique to one of the input channels are routed to one of the output channels, signal components unique to the other of the input channels are routed to another of the output channels, and signal components common to both channels are routed to a third and optionally to a fourth output channel. The frequency-domain output channels are then transformed back into the time-domain, forming an equivalent number of channels of output audio data. The vector operations are performed in a manner that preserves the overall information content of the input data.

30 Claims, 6 Drawing Sheets

U.S. PATENT DOCUMENTS

| | | | | |
|---|---|---|---|---|
| 5,588,063 | A * | 12/1996 | Edgar | 381/300 |
| 5,594,800 | A | 1/1997 | Gerzon | |
| 5,742,690 | A * | 4/1998 | Edgar | 381/300 |
| 5,796,844 | A | 8/1998 | Griesinger | |
| 5,818,941 | A * | 10/1998 | Embree | 381/22 |
| 5,870,480 | A | 2/1999 | Griesinger | |
| 5,912,976 | A | 6/1999 | Klayman et al. | |
| 5,956,411 | A * | 9/1999 | Edgar | 381/97 |
| 5,987,141 | A | 11/1999 | Hoover | |
| 5,995,631 | A * | 11/1999 | Kamada et al. | 381/1 |
| 6,038,323 | A * | 3/2000 | Petroff | 381/1 |
| 6,169,812 | B1 * | 1/2001 | Miller | 381/300 |
| 6,292,570 | B1 | 9/2001 | Aarts | |
| 6,496,584 | B2 | 12/2002 | Irwan et al. | |
| 6,507,659 | B1 * | 1/2003 | Iredale et al. | 381/26 |
| 6,631,193 | B1 * | 10/2003 | Miller | 381/98 |
| 6,639,939 | B1 * | 10/2003 | Naden et al. | 375/140 |
| 6,665,409 | B1 * | 12/2003 | Rao | 381/63 |
| 6,691,073 | B1 * | 2/2004 | Erten et al. | 709/190 |
| 6,725,108 | B1 * | 4/2004 | Hall | 700/94 |
| 6,853,732 | B2 * | 2/2005 | Scofield | 381/27 |
| 7,113,609 | B1 * | 9/2006 | Neidich et al. | 381/305 |
| 7,254,239 | B2 * | 8/2007 | Fincham | 381/17 |
| 7,257,231 | B1 * | 8/2007 | Avendano et al. | 381/99 |
| 2001/0047256 | A1 * | 11/2001 | Tsurushima et al. | 704/200 |
| 2002/0006206 | A1 * | 1/2002 | Scofield | 381/27 |
| 2002/0103635 | A1 * | 8/2002 | Mesarovic et al. | 704/200.1 |
| 2002/0122562 | A1 * | 9/2002 | Brennan et al. | 381/316 |
| 2003/0026441 | A1 * | 2/2003 | Faller | 381/98 |
| 2003/0083024 | A1 * | 5/2003 | Richenstein et al. | 455/99 |
| 2003/0147543 | A1 * | 8/2003 | Katayama et al. | 381/309 |
| 2003/0185411 | A1 * | 10/2003 | Atlas et al. | 381/98 |
| 2004/0037440 | A1 * | 2/2004 | Croft, III | 381/119 |
| 2004/0114939 | A1 * | 6/2004 | Taylor | 398/152 |
| 2004/0142748 | A1 * | 7/2004 | Loose et al. | 463/35 |
| 2004/0157555 | A1 * | 8/2004 | Richenstein et al. | 455/39 |
| 2005/0276420 | A1 * | 12/2005 | Davis | 381/20 |
| 2006/0098827 | A1 * | 5/2006 | Paddock et al. | 381/106 |

OTHER PUBLICATIONS

Feiten, "Pseudo-Stereo and Surround-Sound by Matched FIR-Filters," Audio Engineering Society Preprint No. 4222, pp. 1-11 (1996).
Hull, "Surround Sound Past, Present, and Future: A History of Multichannel Audio from Mag Stripe to Dolby Digital," pp. 1-6 (1999).
Irwan et al., "Two-to-Five Channel Sound Processing," *J. Audio Eng. Soc.*, vol. 50, No. 11, pp. 914-926 (Nov. 2002).
Ten Kate et al., "A New Surround-Stereo-Surround Coding Technique," *J. Audio Eng. Soc.*, vol. 40, No. 5, pp. 376-383 (May 1992).
Griesinger, "Progress in 5-2-5 Matrix Systems," pp. 1-41 (date unknown).
Scheiber, "Analyzing Phase-Amplitude Matrices," *J. Audio Eng. Soc.*, vol. 19, No. 10, pp. 835-839 (Nov. 1971).
Tappan, "An Improvement in Simulated Three-Channel Stereo," *IRE Transactions on Audio*, pp. 72-79 (May-Jun. 1961).
Willcocks, "Surround Sound in the Eighties-Advances in Decoder Technology," Audio Engineering Society Preprint No. 2017, pp. 1-34 (1983).

* cited by examiner

EXTRACTION OF LEFT/CENTER/RIGHT INFORMATION FROM TWO-CHANNEL STEREO SOURCES

CROSS-REFERENCE TO RELATED APPLICATION

The present application claims the priority benefit under 35 U.S.C. § 119(e) of the U.S. Provisional Application Ser. No. 60/500,104, filed Sep. 4, 2003. The aforementioned Provisional Application is incorporated herein by reference in its entirety.

FIELD OF THE INVENTION

The present invention relates generally to the extraction of direction-of-arrival information from two-channel stereo audio signals. However, it may also be employed in connection with all manner of multichannel or multitrack audio sources, provided that at least some channels associated with such sources can be considered pairwise for analysis.

In the preferred aspect utilizing a two-channel stereophonic audio source, the invention relates to determination of direction-of-arrival by comparing the two input channels in the frequency domain, and resolving the signal information, in a vector sense, into "left", "center", and "right" source directions. More specifically, the invention is based upon the assumption that the two input channels constitute a complimentary pair, in which signal components that appear only in the left channel are intended to arrive from left of the listening position, components that appear only in the right channel are intended to arrive from right of the listening position, components that appear equally in the left and right channels are intended to arrive from directly in front-center, and components that appear unequally in the left and right channels are intended to arrive from directions proportionately between center and left or right, as appropriate.

BACKGROUND OF THE INVENTION

The basis of stereophonic sound reproduction was, from the beginning, the re-creation of a realistic two-dimensional sound field that preserved, or at least approximated, direction-of-arrival information for presentation to the listener. Early systems were not limited to two audio channels, in fact many of the earliest systems used in theaters incorporated a multitude of separate channels dispersed all around the listening location. For many reasons, particularly related to phonograph records and, later, radio transmission, most of the channels were dropped and the de facto standard for stereo signals became two channels [1].

Two-channel stereo has enjoyed a long and venerable career, and can in many circumstances provide a highly satisfying listening experience. Early attempts at incorporating more than two channels into the home listening environment did not improve the listening experience enough to justify their added cost and complexity over standard two-channel stereo, and they were eventually abandoned [2]. More recently, however, the increasing popularity of multichannel audio systems such as home theater and DVD-Audio has finally shown the shortcomings of the two-channel configuration and caused consumers to demand more realistic sound-field presentations.

As a result, many modern recordings are being mixed for multichannel reproduction, generally in 5 or 5.1 channel format. However, there is still a tremendous existing base of two-channel stereo material, in analog as well as digital form.

Therefore, many heuristic methods have been, and continue to be, developed for distributing two-channel source material amongst more than two channels. These are generally based upon a "matrixing" operation in which the broadband levels of the left, right, (left+right), and (left−right) source channels are compared. In cases where the left level is much higher than the right level, the output is steered generally to the left, and vice-versa. In cases where the (left+right) level is much higher than the (left−right) level, the signals are assumed to be highly correlated and are steered generally toward the front. In cases where the (left−right) level is much higher than the (left+right) level, the signals are assumed to be highly negatively correlated and are steered generally toward the rear surround channels [3]. Most of these techniques rely heavily upon heuristic algorithms to determine the steering direction for the audio, and usually require special encoding of the signal via phase-shifting, delay, etc., in order to really work properly.

The present invention is based upon the realization that the information that can be extracted from a comparison between two signals can be put to better use than has been demonstrated in prior art. Two signals either have a lot in common (positively correlated) or they do not have a lot in common (uncorrelated or negatively correlated). Their amplitudes are either similar or different. In prior art, these attributes are studied for full-bandwidth, or nearly so, signals, and special encoding is needed during the recording process to provide steering "cues" to the playback system. The present invention analyzes the attributes in the frequency domain, and does not require any special encoding. The result is an improved system and method that can extract highly detailed, frequency-specific direction-of-arrival information from standard, non-encoded stereo signals.

SUMMARY OF THE INVENTION

A digital signal processing device in accordance with the present invention is capable of accepting two channels of stereo audio input data; applying an invertible transform (such as a Discrete Fourier Transform) to the data from each of the channels so that each may be represented as a set of two-dimensional vectors in the frequency domain; comparing the two channel-vectors on a frequency-by-frequency basis; mathematically resolving the two channel-vectors at each frequency into three new vectors, one representing the signal content unique to one of the input channels, another representing the signal content unique to the other of the input channels, and the last representing the signal content common to both input channels; applying the inverse transform (such as the Inverse Discrete Fourier Transform) to each of the three resolved vector sets so that they represent time-domain data for the derived-left, derived-right, and derived-center channels. This vector decomposition is performed in a manner that preserves information content, such that the vector sum of the two input vectors is exactly equivalent to the vector sum of the three derived output vectors, the left-input vector is exactly equivalent to the vector sum of the derived-left output vector and half the derived-center output vector, and the right-input vector is exactly equivalent to the vector sum of the derived-right output vector and half the derived-center output vector.

A digital signal processing device built in accordance with the present invention is optionally capable of further decomposing the aforementioned output vector sets into four output vector sets, the first representing the signal content unique to the left-input channel, the second representing the signal content unique to the right-input channel, the third representing the content common to, and having the same phase angle, in both input channels, and the fourth representing the content common to both input channels but having phase angles that are orthogonal to that of the third output channel; applying the inverse transform (such as the Inverse Discrete Fourier Transform) to each of the four resolved vector sets so that they represent time-domain data for the excess-left, excess-right, common-inphase, and common-quadrature channels, respectively. This vector decomposition is performed in a manner that preserves information content, such that the sum of the two input vectors is exactly equivalent to the sum of the two derived "excess" output vectors and twice the sum of the two derived "common" output vectors, the left-input vector is exactly equivalent to the sum of the excess-left output vectors and the common-inphase output vector and the common-quadrature vector, and the right-input vector is exactly equivalent to the sum of the excess-right output vector and the common-inphase output vector and the negative of the common-quadrature vector. Furthermore, this device is capable of performing these operations upon continuous streams of audio data by application of standard signal processing practices for transform-based filtering, with due regard for circular vs. linear convolution considerations, data tapering windows, overlap-and-add techniques, time-variant filtering, etc.

BRIEF DESCRIPTION OF THE DRAWINGS

The invention may take form in various components and arrangements of components, and in various steps and arrangements of steps. The drawings are only for purposes of illustrating preferred embodiments and are not to be construed as limiting the invention.

DETAILED DESCRIPTION OF THE INVENTION

Figure 1:
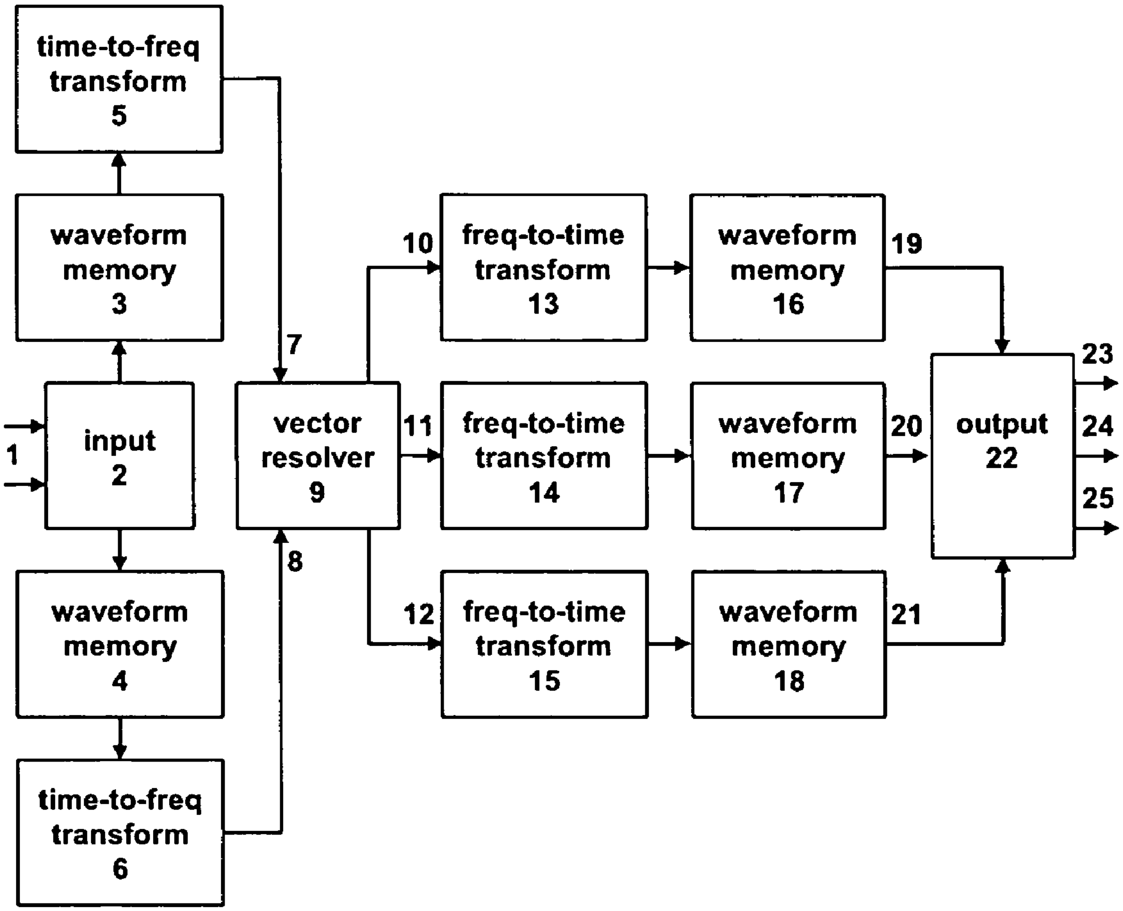
FIG. 1 is a block diagram of a digital signal processing system constructed in accordance with the present invention.

To illustrate the invention, a simplified block diagram of an implementation on a computer-based information handling system, such as a personal computer, that carries out the present invention is shown in FIG. 1. All of the elements of the personal computer apparatus to be described in the following are conventional and well known in the art and are described to illustrate the invention, and it is understood that other arrangements for computation in hardware, software, firmware, or any combination thereof may also be utilized in the present invention.

For example, in certain embodiments, a general-purpose central processing unit may be utilized to perform the digital signal processing functions. In other embodiments, the processing may be performed employing one or more dedicated processors. In further embodiments, a special purpose digital signal processor may be employed to perform computationally intensive processing of the digital signal, and with a general purpose central processing unit being used for any further processing and/or storing the processed signal representations in an electronic memory or other digital storage medium. In still further embodiments, the processing functionality may be implemented in whole or in part employing a dedicated computing device, hardware logic or finite state machine, which may be realized, for example, in an application-specific integrated circuit (ASIC), programmable logic device (PLD), field programmable gate array (FPGA), or the like.

Thus, while the use of multiple processors or processing devices is contemplated, it will be recognized that, for ease of exposition, the term "processor" is also intended to encompass a processing function, module, or subroutine, whether implemented in program or software logic or hardware logic, and reference to multiple processors also encompasses such multiple processing functions, modules, or subroutines sharing or implemented in common hardware.

A digital two-channel stereo time-domain audio signal 1 is received at input 2 to the apparatus. This signal may have been transmitted by suitable means directly from a Compact Disc, or it may have been stored as digital data on some other mass storage device such as a computer hard drive or digital magnetic tape, or it may have passed through some prior digital signal processing apparatus, or it may have been obtained directly from the output of analog-to-digital converters.

The digital data are passed to waveform memory 3 and 4 where the data are assigned and written sequentially to a number of memory positions corresponding to the number of points in transform computations 5 and 6.

Persons skilled in the art will recognize that pre- and/or post-processing of the data may be necessary, that some overlap between data points included in a given transform and data points included in the previous transform(s) is desirable, that application of data-tapering windows to the time-domain data, both before and after the direction-of-arrival extraction is performed, is desirable to avoid edge-effects, that zeropadding of the input time-domain data may be necessary in order to avoid circular-convolution effects, and that this all represents standard signal processing practice for transform-domain filtering [4].

In the prototype preferred embodiment, the sampling rate is 44100 Hz, integer input data are converted to floating-point, transforms are of length 32768 with an overlap of 8192 data points from one transform to the next, a raised-cosine input data tapering window of overall width 16384, centered on the splice between the "old" data and the "new" data, is used with 8192 extra zeropadded points on each end, and the computations are performed in the computer's central processing unit (CPU) and/or floating-point unit (FPU).

Transform computations 5 and 6 convert the blocks of data from the time domain to the frequency domain or, more generally, from the data domain to the transform domain. The transforms may be any of a variety of invertible transforms that can convert data from a one-dimensional data-domain representation to a two-dimensional transform-domain representation, typically but not necessarily the Discrete Fourier Transform that was implemented in the preferred embodiment. Other transforms that may be used include, but are not limited to, the Discrete Wavelet Transform, and invertible transforms of the general mathematical form:

$$X(k)=\sum_{n=0}^{N-1}x(n)[A\cos(2\pi kn/N)+B\sin(2\pi kn/N)]$$

(where A, B may be real, imaginary, complex, or zero), or equivalent thereto, including the Discrete Fourier Transform, Discrete Cosine Transform, Discrete Sine Transform, Discrete Hartley Transform, and Chirp-Z Transform; and various implementations thereof, including, but not limited to, direct computation using the defining equations, linear-algebra/matrix operations, convolution using FIR or IIR filter structures, polyphase filterbanks, subband filters, and especially the so-called "fast" algorithms such as the Fast Fourier Transform.

The type of transform, length of the transform, and amount of overlap between subsequent data sets are chosen according to standard signal processing practice as compromises between frequency resolution, ability to respond quickly to changes in signal characteristics, time-domain transient performance, and computational load.

Once in the transform domain, each transform bin 7 and 8 contains a two-dimensional value, interpreted in the conventional signal processing manner as a complex number, representing the signal content for the channel under consideration at the frequency corresponding to the bin. Each of these complex values can be expressed in the conventional signal processing manner as a vector quantity, in rectangular coordinates as real part and imaginary part, or equivalently in polar coordinates as magnitude and phase. The bin data 7 and 8 are passed to the vector resolver 9 that performs vector arithmetic upon them.

Figure 2:
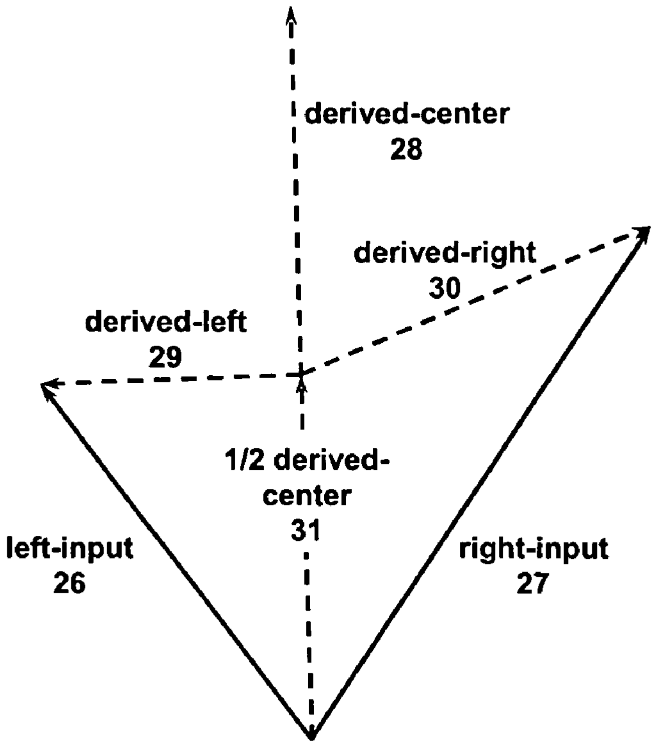
FIG. 2 is a generic graphical representation of the decomposition of the left-input and right-input vectors into the derived-center, derived-left, and derived-right vectors.

As indicated in FIG. 2, within resolver 9, in each transform bin the left-input vector 26 and the right-input vector 27 are decomposed into three new vectors 28, 29, and 30, nominally designated "derived-center," "derived-left," and "derived-right," respectively. The process starts with the creation of the derived-center vector 28, which is conceptually a vector representing the signal content that the left and right channels have "in common".

Figure 3:
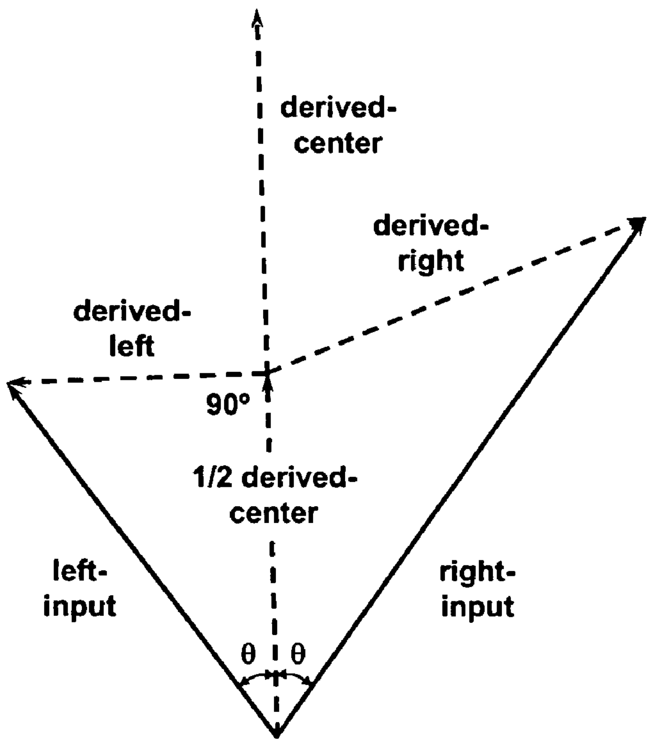
FIG. 3 is a graphical representation of the decomposition of the left-input and right-input vectors into the derived-center, derived-left, and derived-right vectors for the specific case in which the phase angle of the derived-center vector is constrained to be halfway between the phase angles of the left-input and right-input vectors.
Figure 4:
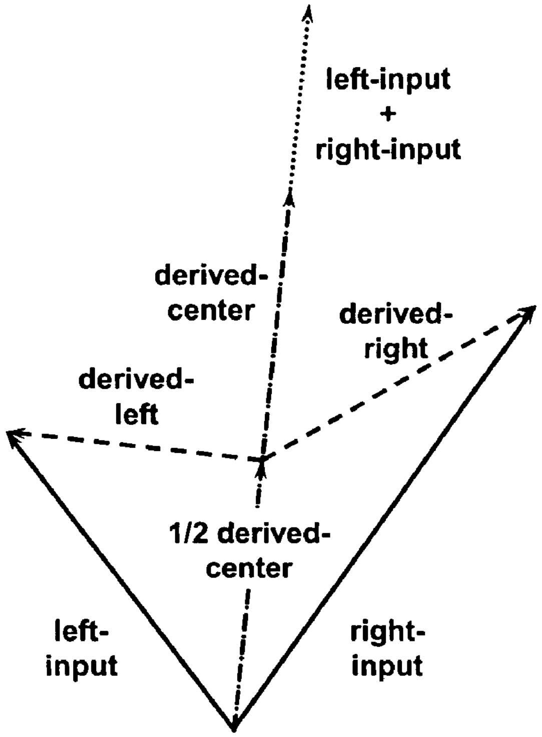
FIG. 4 is a graphical representation of the decomposition of the left-input and right-input vectors into the derived-center, derived-left, and derived-right vectors for the specific case in which the phase angle of the derived-center vector is constrained to be equal to the phase angle of the vector sum of the left-input and right-input vectors.
Figure 5:
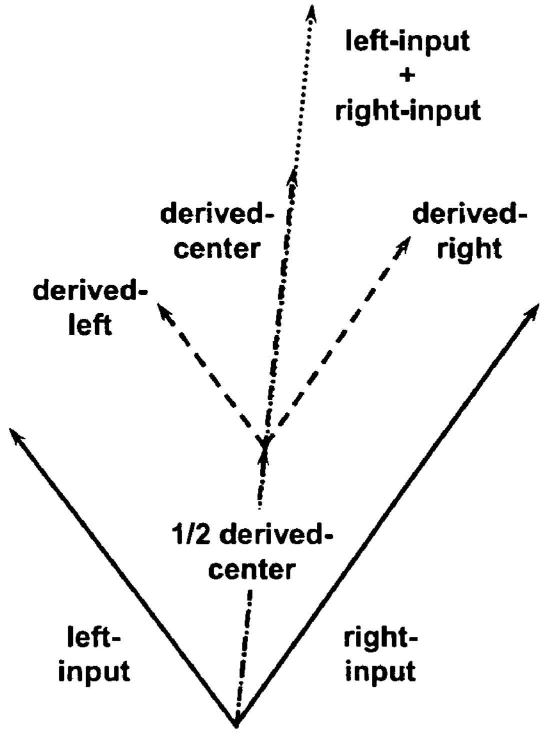
FIG. 5 is a graphical representation of the decomposition of the left-input and right-input vectors into the derived-center, derived-left, and derived-right vectors for the specific case in which the derived-center vector is equal to a constant "K" times the vector sum of the left-input and right-input vectors, the derived-left vector is equal to the constant "1-K" times the left-input vector, and the derived-right vector is equal to the constant "1-K" times the right-input vector.
Figure 6:
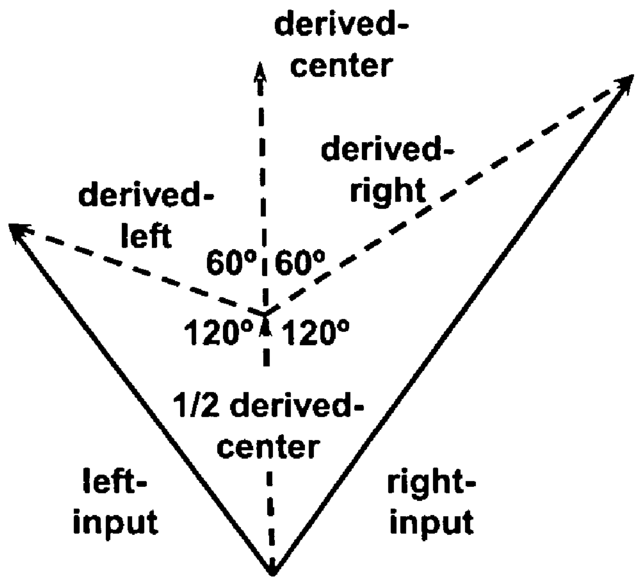
FIG. 6 is a graphical representation of the decomposition of the left-input and right-input vectors into the derived-center, derived-left, and derived-right vectors for the specific case in which the angle between the derived-center vector and the derived-left vector, and the angle between the derived-center vector and the derived-right vector, are both constrained to be 60°.
Figure 7:
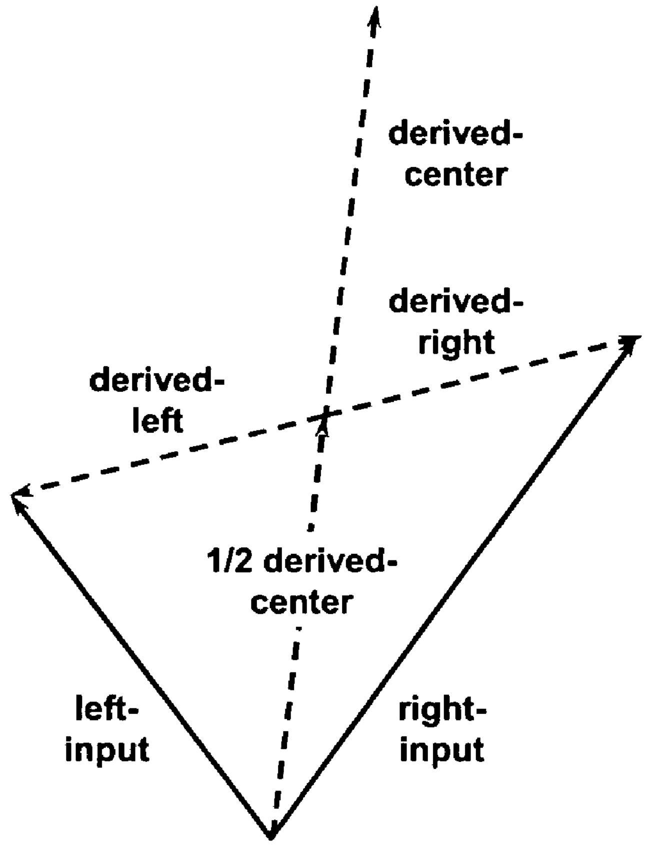
FIG. 7 is a graphical representation of the decomposition of the left-input and right-input vectors into the derived-center, derived-left, and derived-right vectors for the specific case in which the derived-left vector is constrained to be the negative of the derived-right vector.
Figure 8:
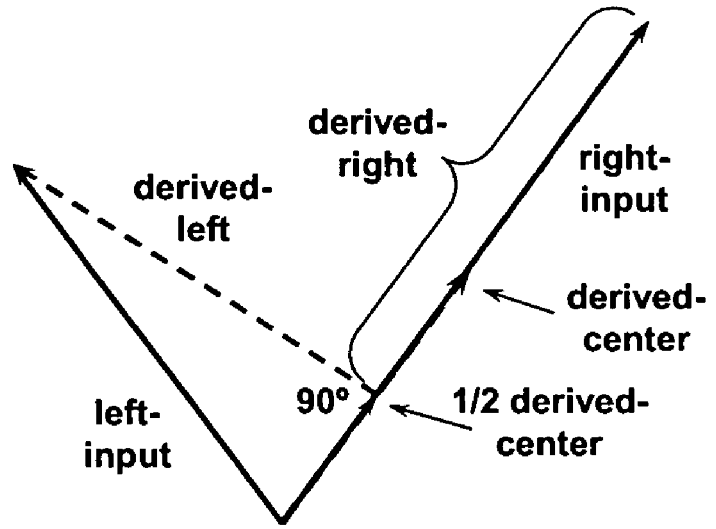
FIG. 8 is a graphical representation of the decomposition of the left-input and right-input vectors into the derived-center, derived-left, and derived-right vectors for the specific case in which the shorter of the two input vectors is projected onto the longer.

Methods for the computation of the derived-center vector 28 include, but are not limited to, those shown in FIGS. 3 through 8. Among these, the methods of FIGS. 3, 4, and 5 are the most generally applicable and require the fewest constraints. Because a unique definition for what two vectors have "in common" does not exist, persons skilled in the art will recognize that other mathematically viable schemes could be conceived.

In the prototype preferred embodiment, which is represented by FIGS. 2 and 3, the phase angle is defined to be the average of the phase angles of the left-input channel and the right-input channel, and the derived-center magnitude is obtained by doubling (to account for the contribution from each of the two input channels) the perpendicular projection of the shorter of the two input-channel vectors onto the unit vector in the direction of the derived-center vector. This method was selected based upon the results of subjective listening tests, with due regard to ease of implementation. In practice, the selection of vector resolution scheme might be based upon performance with specific program content.

Once the derived-center vector 28 has been created, the derived-left vector 29 is computed as "left-input minus ½-derived-center" and the derived-right vector 30 is computed as "right-input minus ½-derived-center", using vector arithmetic. The derived-left vector is conceptually the signal content that is unique to the left input channel, and the derived-right vector is conceptually the signal content that is unique to the right input channel. In each transform bin, information is preserved because the vector sum of derived-center 28, derived-left 29, and derived-right 30 is exactly equal to the vector sum of left-input 26 and right-input 27. Furthermore, the vector sum of ½-derived-center 31 and derived-left 29 is exactly equal to left-input 26, and the vector sum of ½-derived-center 31 and derived-right 30 is exactly equal to right-input 27.

This process is repeated for all of the transform bins, yielding three new complete transform blocks; designated left 10, center 11, and right 12, that are passed to the inverse transform computations 13, 14, and 15, respectively. The inverse transforms convert the blocks into the data domain, where they are stored in waveform memories 16, 17, and 18, and then, following standard signal processing practice, post-processed if necessary, aligned, windowed and combined with similar data from previous and subsequent blocks of time in a fashion appropriate for their original overlap, windowing, and zeropadding, to yield contiguous time-domain data streams 19, 20, and 21 in each of the three output (22) channels 23, 24, and 25, respectively.

In the prototype preferred embodiment, a 50% cosine-taper Tukey output data tapering window [5], with rectangle portion of width 16384 and cosine portion of width 16384, is applied to the outputs from the inverse transform computations. An overlap-and-add technique is utilized for reconstructing the time-domain data because this invention is, in its essence, a form of signal-dependent time-variant linear filtering, and overlap-and-add is superior to overlap-and-save when time-variant filters are used. The time data are converted from floating-point back to integer by appropriate means.

The resulting data streams 19, 20, and 21 may be auditioned, stored as digital data, or passed through further signal processing, as desired.

The result of all of this vector manipulation is that monophonic signal components, in which the data are identical and in-phase in both input channels, are routed to the center output channel. Signal components that occur uniquely in the left or right input channel are routed exclusively to the left or right output channel, respectively. Signal components that are identical in both input channels, but out-of-phase, are treated as unique signal components and are not routed to the center output channel. Signal components that are combinations of the above are routed accordingly and proportionately to the output channels. Furthermore, since this process is repeated on a frequency-by-frequency basis in the transform domain, the invention has unprecedented ability to separate signal components by frequency as well as by magnitude and phase or real and imaginary part, and to route them to the output channels accordingly.

This technique may be varied in order to achieve some desired effects.

Figure 9:
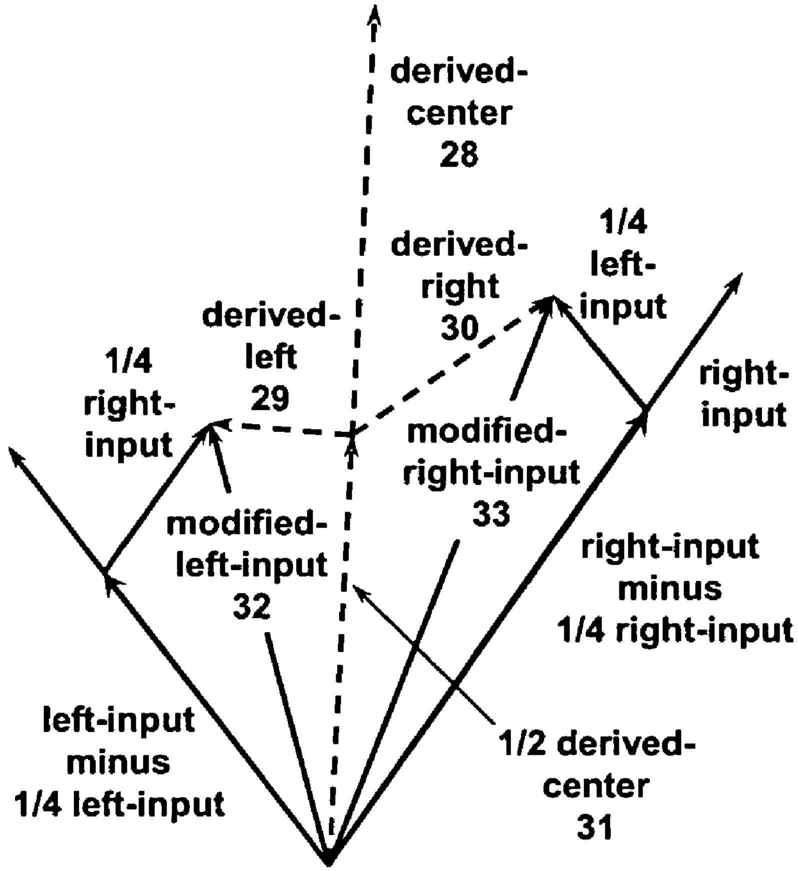
FIG. 9 is a graphical representation of the decomposition of the left-input and right-input vectors into the derived-center, derived-left, and derived-right vectors for the specific case in which the relative content of the derived-center vector is artificially increased by moving a portion of the left-input channel content to the right-input channel, and vice-versa.

For example, if the left-input and right-input channels have very little in common, then the derived-center channel may lack content. To avoid a subjective "hole-in-the-middle" sensation, some amount of material from the left-input channel may be moved into the right-input channel, and vice-versa, forming "modified-left-input" 32 and "modified-right-input" 33, as shown in FIG. 9; an example case identical to FIG. 3 except that ¼ of left-input is added to right-input, and ¼ of right-input is added to left-input. Then modified-left-input 32 and modified-right-input 33 are utilized by the vector resolver 9, in place of left-input 26 and right-input 27, and the process otherwise proceeds as described above.

Figure 10:
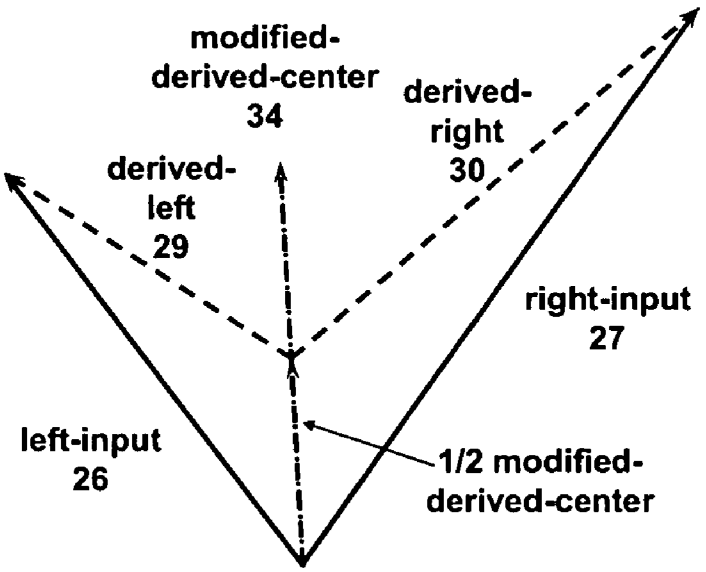
FIG. 10 is a graphical representation of the decomposition of the left-input and right-input vectors into the derived-center, derived-left, and derived-right vectors for the specific case in which the relative content of the derived-center vector is artificially decreased by scaling the derived-center vector by a factor between zero and one prior to extracting the derived-left and derived-right vectors.

Conversely, if the left-input and right-input channels have too much in common, then the derived-center channel may overwhelm the others. To avoid a subjective "everything-in-the-middle" sensation, the magnitude of derived-center vector 28, once created, may be multiplied by a scale-factor between zero and one, yielding "modified-derived-center" 34, as indicated in FIG. 10; an example case identical to FIG. 3 except that the scale-factor is set to ½. The derived-left vector 29 is then computed as "left-input minus ½-modified-derived-center" and the derived-right vector 30 is computed as "right-input minus ½-modified-derived-center". In each case, overall information content is still preserved, because in the former the vector sum of derived-center 28, derived-left 29, and derived-right 30 is exactly equal to the vector sum of left-input 26 and right-input 27, and in the latter the vector sum of modified-derived-center 34, derived-left 29, and derived-right 30 is exactly equal to the vector sum of left-input 26 and right-input 27.

The modifications shown in FIGS. 9 and 10 need not be applied uniformly at all frequencies. It is quite reasonable to expect that some program material may benefit from enhancement of center-channel content at some frequencies and reduction at others, with no modifications at the remainder.

Figure 11:
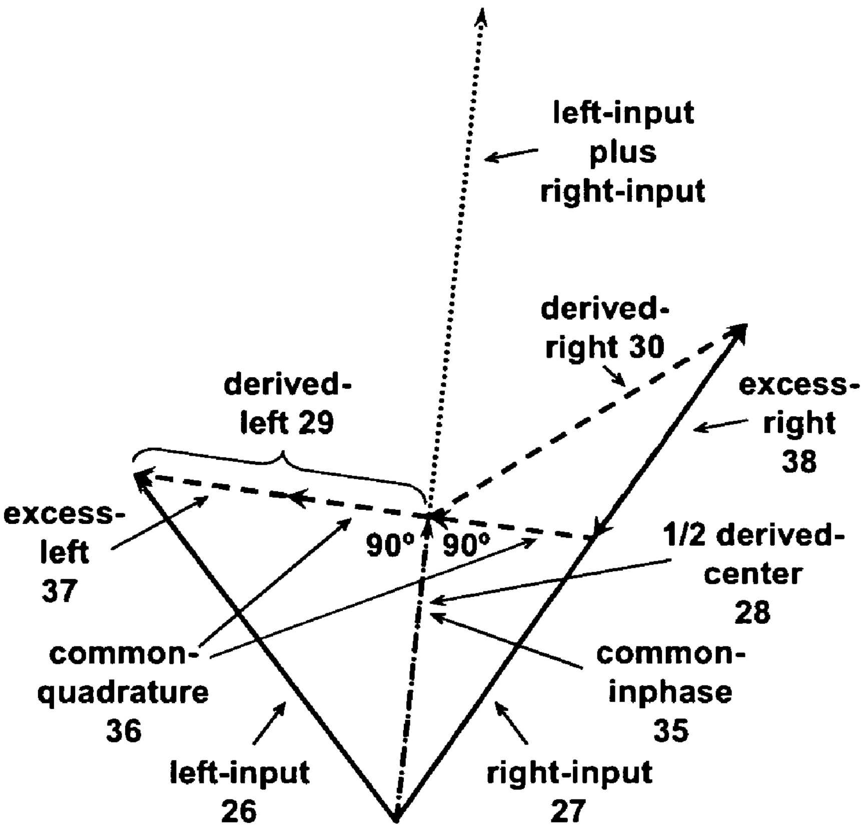
FIG. 11 is a graphical representation of the decomposition of the left-input and right-input vectors into the common-inphase, common-quadrature, excess-left, and excess-right vectors for the specific case in which the phase angle of the common-inphase vector is constrained to be equal to the phase angle of the vector sum of the left-input and right-input vectors.

Finally, FIG. 11 shows a variant in which the each of the derived-left 29/derived-right 30 vectors from FIG. 4 is decomposed into two component vectors, at least one of which is orthogonal to the derived-center 28 vector. These definitions result in four output vectors: common-inphase 35 (equivalent to ½-derived-center 28), common-quadrature 36 (where the positive direction of the common-quadrature 36 vector has been arbitrarily defined such that it lies on the same side of derived-center 28 as left-input 26), excess-left 37, and excess-right 38. This contrasts with the standard method of FIGS. 2 through 8, which only results in three output vectors: derived-center 28, derived-left 29, and derived-right 30. The four vectors of FIG. 11 are derived in a manner similar to the previous three-vector cases; common-quadrature 36 is equal to derived-left 29, or the negative of derived-right 30, whichever is shorter, excess-left 37 is computed as "left-input minus common-inphase minus common-quadrature" (and may, in some cases, be equal to zero), and excess-right 38 is computed as "right-input minus common-inphase plus common-quadrature" (and may, in some cases, be equal to zero). In each transform bin, information content can be preserved because the vector sum of twice common-inphase 35, ±common-quadrature 36, excess-left 37, and excess-right 38 is exactly equal to the vector sum of left-input 26 and right-input 27. Furthermore, the vector sum of common-inphase 35, common-quadrature 36, and excess-left 37 is exactly equal to left-input 26, and the vector sum of common-inphase 35, the negative of common-quadrature 36, and excess-right 38 is exactly equal to right-input 27.

The variant shown in FIG. 11 requires four inverse-transform operations to return to the time-domain instead of three, but allows access to both the common-inphase and common-quadrature time-domain data. The standard derived-center 28, derived-left 29, and derived-right 30 signals can be obtained from common-inphase 35, common-quadrature 36, excess-left 37, and excess-right 38 as follows: derived-center 28 equals twice common-inphase 35, derived-left 29 equals excess-left 37 plus common-quadrature 36, and derived-right 30 equals excess-right 38 minus common-quadrature 36. Applications in which access to common-quadrature and common-inphase data is useful include, but are not limited to, stereo signals that incorporate matrix-encoded surround material. In such cases, the surround components appear in quadrature and out of phase in the left-input and right-input signals, and are, themselves, also of interest.

Persons skilled in the art will recognize that, although in the preferred embodiment the vector computations are performed in the computer's FPU, similar computations can be performed without explicit transcendental functions such as sines, cosines, and arctangents. Fixed-point arithmetic, function approximations, lookup tables, and/or vector manipulations such as cross-products, dot-products, and coordinate rotations, among others, are all recognized as viable means by which the vector quantities may be resolved.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory of one or more computer-based information handling systems generally as described above. Until required by the computer system, the set of instructions may be stored in another computer readable memory, for example in a hard disk drive or in a removable memory such as an optical disk for utilization in a DVD-ROM or CD-ROM drive, a magnetic medium for utilization in a magnetic media drive, a magneto-optical disk for utilization in a magneto-optical drive, a floptical disk for utilization in a floptical drive, or a memory card for utilization in a card slot. Further, the set of instructions can be stored in the memory of another computer and transmitted over a local area network or a wide area network, such as the Internet, when desired by the user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, optically, or holographically, so that the medium carries computer readable information.

It is understood that the invention is not confined to the particular embodiments set forth herein as illustrative, but embraces such modified forms thereof as come within the scope of the following claims.

REFERENCES

All references cited are incorporated herein by reference in their entireties.

[1] "Surround Sound Past, Present, and Future", Joseph Hull, Dolby Laboratories Inc., pp. 1-2.
[2] Hull, op cit., pp. 2-3.
[3] "Progress in 5-2-5 Matrix Systems", David Griesinger, Lexicon, pp. 2-3.
[4] "Digital Signal Processing", Alan V. Oppenheim and Ronald W. Schafer, Prentice-Hall, Inc., section 3.8.
[5] "On the use of Windows for Harmonic Analysis with the Discrete Fourier Transform", Frederic J. Harris, PROCEEDINGS OF THE IEEE, VOL. 66, NO. 1, JANUARY 1978.

What is claimed is:

1. A digital signal processing method for creating a multiple channel time-domain audio signal from a stereo audio signal having a left-input channel digital time-domain signal produced by a stereo sound recording system and a right-input channel digital time-domain signal produced by a stereo sound recording system, comprising:

applying, in a digital signal processor, a time-domain to frequency-domain transform to the left-input channel signal and to the right-input channel signal so that, at each of a plurality of frequencies, the left-input channel signal and the right-input channel signal are represented as a pair of vectors;

mathematically resolving in said processor, said pairs of vectors into three derived vectors: a derived-left vector, a derived-right vector, and a derived-center vector such that a vector sum of the derived-left vector and one half of the derived-center vector equals the left-input vector, and a vector sum of the derived-right vector and a remaining half of the derived-center vector equals the right-input vector;

and applying in said processor, a frequency-domain to time-domain transform to the derived vectors to generate a derived-left output channel time-domain signal for playback in a left channel of a multi-channel sound system, a derived-right output channel time-domain signal for playback in a right channel of a multi-channel sound system and a derived-center output channel time-domain signal for playback in a center channel of a multi-channel sound system.

2. The method of claim 1 wherein each of the derived-left, derived-right and derived-center vectors is two-dimensional.

3. The method of claim 2 wherein, in step (a), the components of the vectors representing the left-input channel and the right-input channel signals represent real and imaginary values.

4. The method of claim 2 wherein, in step (a) the components of the vectors representing the left-input and right-input channel signals represent phase angle and magnitude and step (b) comprises for each pair of vectors, creating a derived-center vector having a phase angle between the phase angles of the vector pair and having a magnitude equal to a multiple of the length of a perpendicular projection of a shorter vector of the vector pair onto a unit vector extending in a direction of the derived-center vector.

5. The method of claim 4 wherein step (b) comprises for each pair of vectors, creating a derived-center vector having a phase angle equal to an average of the phase angles of the vector pair and having a magnitude equal to twice the length of a perpendicular projection of a shorter vector of the vector pair onto a unit vector extending in a direction of the derived-center vector.

6. The method of claim 5 wherein a left-input vector represents the left-input channel signal and a right-input vector represents the right-input channel signal, and step (b) comprises generating a derived-left vector by subtracting one-half of the derived-center vector from the left-input vector, using vector arithmetic, and a derived-right vector is generated by subtracting one-half of the derived-center vector from the right-input vector, using vector arithmetic.

7. The method of claim 4 wherein step (b) comprises for each pair of vectors, creating a derived-center vector having a phase angle equal to a phase angle of a vector that is a sum of the two vectors that comprise the vector pair and having a magnitude equal to twice the length of a perpendicular projection of a shorter vector of the vector pair onto a unit vector extending in a direction of the derived-center vector.

8. The method of claim 7 wherein a left-input vector represents the left-input channel signal and a right-input vector represents the right-input channel signal, and step (b) comprises generating a derived-left vector by subtracting one-half of the derived-center vector from the left-input vector, using vector arithmetic, and a derived-right vector is generated by subtracting one-half of the derived-center vector from the right-input vector, using vector arithmetic.

9. The method of claim 4 wherein step (b) comprises for each pair of vectors, creating a derived-center vector having a phase angle equal to a phase angle of one of the vectors that comprise the vector pair and having a magnitude equal to twice the length of a perpendicular projection of a shorter vector of the vector pair onto a unit vector extending in a direction of the derived-center vector.

10. The method of claim 9 wherein a left-input vector represents the left-input channel signal and a right-input vector represents the right-input channel signal, and step (b) comprises generating a derived-left vector by subtracting one-half of the derived-center vector from the left-input vector, using vector arithmetic, and a derived-right vector is generated by subtracting one-half of the derived-center vector from the right-input vector, using vector arithmetic.

11. The method of claim 1 wherein a left-input vector represents the left-input channel signal and a right-input vector represents the right-input channel signal and step (b) further comprises for at least some frequencies, adding a predetermined portion of the left-input vector to the right-input vector prior to creation of the derived-center vector and adding a predetermined portion of the right-input vector to the left-input vector prior to creation of the derived-center vector.

12. The method of claim 1 wherein step (b) further comprises for at least some frequencies, creating the derived-center vector first and multiplying the derived-center vector by a scale factor before creating the derived-left and derived-right vectors.

13. The method of claim 1 wherein, in step (a), a left-input vector of the pair of vectors represents the left-input channel signal and a right-input vector represents the right-input channel signal and wherein the method further comprises prior to step (c) further processing the derived-left, derived-right and derived-center vectors to create a common-inphase vector equal to one-half of the derived-center vector, a common-quadrature vector equal to the shorter of the derived-left vector and a negative of the derived-right vector, an excess-left vector equal to the left-input vector minus the common-inphase vector minus the common-quadrature vector and an excess-right vector equal to the right-input vector minus the common-inphase vector plus the common-quadrature vector.

14. The method of claim 1, wherein, in step (a), a left-input vector of the pair of vectors represents the left-input channel signal and a right-input vector represents the right-input channel signal and wherein step (b) comprises mathematically resolving pairs of vectors generated in step (a) so that the vector sum of the derived-center, derived-left, and derived-right vectors is exactly equal to the vector sum of the left-input and right-input vectors, thereby preserving audio information content at each of the plurality of frequencies.

15. The method of claim 1, wherein, in step (a), a left-input vector of the pair of vectors represents the left-input channel signal and a right-input vector represents the right-input channel signal and wherein step (b) comprises mathematically resolving pairs of vectors generated in step (a) so that the vector sum of one half of the derived-center vector and the derived-left vector is exactly equal to the left-input vector, and the vector sum of one half of the derived-center vector and the derived-right vector is exactly equal to right-input vector, thereby preserving audio information content at each of the plurality of frequencies.

16. A digital signal processing device for creating a multiple channel time-domain audio signal from a stereo audio signal having a left-input channel digital time-domain signal and a right-input channel digital time-domain signal, the device comprising:

a memory;

a time-domain to frequency-domain transform that, responsive to the left-input channel signal, generates at each of a plurality of frequencies, a left-input vector that represents the left-input channel signal and responsive to the right-input channel signal, generates at each of the plurality of frequencies, a right-input vector that represents the right-input channel signal and that stores the left-input vector and the right input vector in the memory;

a vector resolver that, at each of the plurality of frequencies retrieves a left-input vector and a right-input-vector corresponding to that frequency from the memory and mathematically resolves that left-input vector and that right-input-vector into three derived vectors: a derived-left vector, a derived-right vector, and a derived-center vector such that a vector sum of the derived-left vector and one half of the derived-center vector equals the left-input vector, and a vector sum of the derived-right vector and a remaining half of the derived-center vector equals the right-input vector; and a frequency-domain to time-domain transform that, responsive to the derived-left vectors generates a derived-left output channel time-domain signal, responsive to the derived-right vectors generates a derived-right output channel time-domain signal and responsive to the derived-center vectors generates a derived-center output channel time-domain signal.

17. The device of claim 16 wherein each of the derived-left, derived-right and derived-center vectors is two-dimensional.

18. The device of claim 17 wherein the time-domain to frequency-domain transform generates the left-input vector and the right-input vector with components representing real and imaginary values.

19. The device of claim 17 wherein the time-domain to frequency-domain transform generates the left-input vector and the right-input vector with components representing phase angle and magnitude and wherein the vector resolver, at each frequency, creates a derived-center vector having a phase angle between the phase angles of the left-input vector and the right input-vector and having a magnitude equal to a multiple of the length of a perpendicular projection of a shorter vector of the left-input vector and the right-input vector onto a unit vector extending in a direction of the derived-center vector.

20. The device of claim 19 wherein the vector resolver, at each frequency, creates a derived-center vector having a phase angle equal to an average of the phase angles of the left-input vector and the right-input vector and having a magnitude equal to twice the length of a perpendicular projection of a shorter vector of the left-input vector and the right-input vector onto a unit vector extending in a direction of the derived-center vector.

21. The device of claim 20 wherein the vector resolver generates a derived-left vector by subtracting one-half of the derived-center vector from the left-input vector, using vector arithmetic, and a derived-right vector is generated by subtracting one-half of the derived-center vector from the right-input vector, using vector arithmetic.

22. The device of claim 19 wherein the vector resolver, at each frequency, creates a derived-center vector having a phase angle equal to a phase angle of a vector that is equal to a sum of the left-input vector and the right input-vector and having a magnitude equal to a multiple of the length of a perpendicular projection of a shorter vector of the left-input vector and the right-input vector onto a unit vector extending in a direction of the derived-center vector.

23. The device of claim 22 wherein the vector resolver generates a derived-left vector by subtracting one-half of the derived-center vector from the left-input vector, using vector arithmetic, and a derived-right vector is generated by subtracting one-half of the derived-center vector from the right-input vector, using vector arithmetic.

24. The device of claim 19 wherein the vector resolver, at each frequency, creates a derived-center vector having a phase angle equal to a phase angle of one of the left-input vector and the right input-vector and having a magnitude equal to a multiple of the length of a perpendicular projection of a shorter vector of the left-input vector and the right-input vector onto a unit vector extending in a direction of the derived-center vector.

25. The device of claim 24 wherein the vector resolver generates a derived-left vector by subtracting one-half of the derived-center vector from the left-input vector, using vector arithmetic, and a derived-right vector is generated by subtracting one-half of the derived-center vector from the right-input vector, using vector arithmetic.

26. The device of claim 16 wherein the vector resolver, for at least some frequencies, adds a predetermined portion of the left-input vector to the right-input vector prior to creation of the derived-center vector and adds a predetermined portion of the right-input vector to the left-input vector prior to creation of the derived-center vector.

27. The device of claim 16 wherein the vector resolver, for at least some frequencies, creates the derived-center vector first and multiplies the derived-center vector by a scale factor before creating the derived-left and derived-right vectors.

28. The device of claim 16 wherein the vector resolver comprises a mechanism that further processes the derived-left, derived-right and derived-center vectors to create a common-inphase vector equal to one-half of the derived-center vector, a common-quadrature vector equal to the shorter of the derived-left vector and a negative of the derived-right vector, an excess-left vector equal to the left-input vector minus the common-inphase vector minus the common-quadrature vector and an excess-right vector equal to the right-input vector minus the common-inphase vector plus the common-quadrature vector.

29. The device of claim 16, wherein the vector resolver mathematically resolves the left-input vector and the right-input vector so that the vector sum of the derived-center, derived-left, and derived-right vectors is exactly equal to the vector sum of the left-input and right-input vectors, thereby preserving audio information content at each of the plurality of frequencies.

30. The device of claim 16, wherein the vector resolver mathematically resolves the left-input vector and the right-input vector so that the vector sum of one half of the derived-center vector and the derived-left vector is exactly equal to the left-input vector, and the vector sum of one half of the derived-center vector and the derived-right vector is exactly equal to right-input vector, thereby preserving audio information content at each of the plurality of frequencies.

* * * * *